United States Patent [19]

Bailey et al.

[11] Patent Number: 4,663,213
[45] Date of Patent: May 5, 1987

[54] TRANSPARENT MULTI-LAYER COVER FILM FOR RETROREFLECTIVE SHEETING

[75] Inventors: Terry R. Bailey, Woodbury; Roger R. Kult, Maplewood; Louis C. Belisle, Oakdale, all of Minn.

[73] Assignee: Minnesota Mining and Manufacturing Company, St. Paul, Minn.

[21] Appl. No.: 799,099

[22] Filed: Nov. 18, 1985

[51] Int. Cl.$^4$ ............................................. G02B 5/128
[52] U.S. Cl. ............................... 428/204; 156/244.11; 428/210; 428/325; 428/424.2; 428/913
[58] Field of Search ............ 428/325, 204, 210, 424.2, 428/913; 156/244.11

[56] References Cited

U.S. PATENT DOCUMENTS 2,407,680   3/1945   Palmquist et al. ...................... 88/82
3,190,178   6/1961   McKenzie .............................. 88/82
4,025,159   5/1977   McGrath ............................. 350/105
4,025,674   5/1977   Mizuochi ............................ 428/29
4,511,210   4/1985   Tung et al. ......................... 350/105

Primary Examiner—Marion C. McCamish
Attorney, Agent, or Firm—Donald M. Sell; James A. Smith; Roger R. Tamte

[57] ABSTRACT

Retroreflective sheeting has a flat, transparent cover film of excellent clarity and weatherability that resists dirt accumulation while also having good flexibility, conformability and stretchability, this desirable combination of properties being achieved when the cover film includes a urethane inner layer and an acrylic outer layer. The acrylic outer layer preferably is a copolymer of 60 to 80 parts of methyl methacrylate and correspondingly 40 to 20 parts by weight of at least one of ethyl acrylate, n-butyl acrylate, and-butyl methacrylate. The urethane inner layer comprises a thermoplastic aliphatic urethane polymer.

15 Claims, 3 Drawing Figures

TRANSPARENT MULTI-LAYER COVER FILM FOR RETROREFLECTIVE SHEETING

FIELD OF THE INVENTION

The invention concerns retroreflective sheeting which has a flat, transparent cover film and specifically concerns the transparent cover film.

BACKGROUND ART

The earliest retroreflective sheeting had an exposed-lens construction, but its retro-reflective light was blanked out when the lenticular surface of the exposed microlenses was covered with water. This problem was answered by enclosed-lens or embedded-lens retroreflective sheeting in which, as first taught in U.S. Pat. No. 2,407,680 (Palmquist et al.), a monolayer of the microlenses were embedded within the sheeting which had a flat, transparent cover film. This allowed incident light rays to be focused onto the specularly reflective layer irrespective of whether the front of the sheeting was wet or dry.

Another type of enclosed-lens or embedded-lens retroreflective sheeting is taught in U.S. Pat. No. 4,511,210 (Tung et al.). That sheeting may be made from a retroreflecting base material as shown in FIG. 6 including sequentially a layer 25 of pressure-sensitive adhesive, an aluminum specularly reflective layer 24, a transparent spacing layer 23, and a monolayer of glass microspheres 21 partially protruding from the front surface of the sheet material. "Thereafter an oriented polymethylmethacrylate film 26 coated with a layer of pressure-sensitive acrylate adhesive 27 was pressed against the microsphere-exposed surface, embedding the microspheres into the adhesive and forming a transparent front layer on the sheeting in the manner shown in FIG. 2" (Col. 6, lines 40-45). Before applying the polymethylmethacrylate film, the retroreflecting base material was optically incomplete, and its elements were selected so that the application of the flat polymethylmethacrylate cover film would complete the optics.

In addition to the optical role of the cover film, it should protect the underlying elements of the retroreflective sheeting against adverse effects of ultraviolet radiation and moisture. It also should have a smooth surface that is highly transmissive of light, should resist dirt accumulation, and for some uses should be inkable. The cover film also can lend flexibility and extensibility to the retroreflective film or it can make the film stiffer and less flexible.

The flat, transparent cover film of the Palmquist patent can be provided either by a coating such as the acrylic polyester of its Example 1 or by a preformed plastic film. The flat, transparent cover film used in Example 1 of the Tung patent is a preformed polymethylmethacrylate film 26 which has excellent clarity and weatherability and doesn't pick up dirt. However, it is quite brittle and often cracks when the retroreflective sheeting is flexed or stretched such as when the sheeting is being conformed to the head of a rivet or embossed after being adhered to a license plate blank. To afford retroreflective sheeting of better flexibility and stretchability, other materials have been used as transparent cover films such as alkyd resins or plasticized polyvinyl chloride. Cover films of these materials have less resistance to weathering and are more likely to become contaminated by dirt.

U.S. Pat. No. 3,190,178 (McKenzie) solved in a different way the problem of retaining retroreflectivity while wet. Its solution involved modifying retroreflective sheeting of the exposed-lens type wherein the lenses are partially embedded in a binder layer. As described in that patent, the exposed lenses are protected by a flat, transparent cover film to which the binder layer is sealed along a network of interconnecting lines to form a plurality of hermetically sealed cells within which the microspheres are encapsulated and have an air interface. Such wet-reflecting sheeting is called "encapsulated-lens retroreflective sheeting". Its transparent cover film must be a preformed plastic film which should serve the same needs and present the same problems as those mentioned above for enclosed-lens or embedded-lens retroreflective sheeting, except that the base material underlying the cover film of encapsulated-lens retroreflective sheeting is optically complete.

Another type of wet-reflecting retroreflective sheeting is prismatic rather than lenticular. The prismatic sheeting typically is molded plastic, one flat surface of which is exposed to the elements. The plastic is selected primarily for transparency and dimensional stability, but also to provide good resistance to weathering and dirt accumulation. By applying a transparent cover film over the molded plastic, selection of the plastic is no longer constrained by resistance to dirt accumulation, and the plastic need not have such good weathering resistance. A suitable prismatic retroreflective sheeting is disclosed in U.S. Pat. No. 4,025,159 (McGrath).

OTHER PRIOR ART

Also of possible interest to the present invention is the retroreflective sheeting illustrated in FIG. 2 of U.S. Pat. No. 4,025,674 (Mizuochi) which has a 2-layer transparent cover film and a printed layer between the two layers.

DISCLOSURE OF INVENTION

The invention provides wet-reflecting retroreflective sheeting having a flat, transparent cover film which is resistant both to weathering and dirt pickup while also being highly resistant to cracking when the retroreflective sheeting is flexed or stretched. These improved properties are achieved by virtue of a flat, transparent, multi-layer cover film, an outer layer of which comprises an acrylic copolymer of monomers comprising methyl methacrylate and another acrylate or methacrylate, the alkyl or aralkyl group of which contains up to eight carbon atoms. The methyl methacrylate comprises from 20 to 90 percent by weight of the monomers. An inner layer of the multi-layer cover film comprises a thermoplastic aliphatic urethane polymer, the thickness of which preferably exceeds that of the outer layer, thus affording good flexibility, conformability, and stretchability to the novel retroreflective sheeting. These characteristics are demonstrated by the ability of the multi-layer cover film of the novel sheeting to resist cracking when the sheeting is used to make an embossed license plate. Even when die-embossed to depths as great as 2.5 mm at temperatures as low as 10° C., typical multi-layer cover films of retroreflective sheeting of the invention have not cracked. This capability is surprising in view of the fact that the copolymeric outer layers of identical retroreflective sheeting, except omitting the urethane inner layer, have cracked during the die-embossing of license plates at ordinary room temperatures to a depth of 1.5 mm.

The copolymeric outer layer of the flat, transparent cover film of the retroreflective sheeting of the invention preferably is a copolymer of from 60 to 80 parts of methyl methacrylate and correspondingly from 40 to 20 parts by weight of at least one of ethyl acrylate, n-butyl acrylate, and n-butyl methylacrylate, all of which are readily available at moderate cost.

A multi-layer cover film made of the aforementioned materials can be expected to have a stretchability of at least 50%. Greater elongation may be required for certain uses, e.g., to permit the retroreflective sheeting to stretch sufficiently to be applied to a traffic cone or to irregular surfaces such as sidewalls of various automotive vehicles. Good stretchability also is required when the novel retroreflective sheeting is to be embossed, e.g., when mounted on a license plate blank. To permit the blank to be embossed in a male/female die to a depth of 2.5 mm with no danger of cracking, the elongation of the cover film should be at least 100%, preferably at least 200%. Good stretchability is also required for use of the novel retroreflective sheeting in flexible traffic markers which must withstand repeated flexing under the tires of automotive vehicles.

Preferably the thickness of the copolymeric outer layer of the multi-layer cover film of the novel retroreflective sheeting is from 5 to 40 micrometers. It is difficult, and hence uneconomical at the present time, to form this layer to less than about 2 micrometers, while more than about 50 micrometers would tend to make the retroreflective sheeting boardy. Preferably the thickness of the urethane inner layer is from 25 to 100 micrometers. Urethane layer thicknesses less than 10 micrometers may not afford the desired flexiblity, conformability, and stretchability to the novel retroreflective sheeting. Urethane layer thicknesses greater than 200 micrometers may be uneconomical.

In addition to the urethane inner layer and the copolymeric outer layer, the multi-layer cover film of the invention may include additional layers. For example, over the copolymeric outer layer may be applied an exceedingly thin layer of substantially methylmethacrylate homopolymer to provide optimum resistance to weathering and dirt pickup. There also may be an interior fluoropolymer layer in order to provide improved water-vapor resistance. To provide good adhesion between the urethane inner layer and an intermediate fluoropolymer layer, the latter may be blended with an acrylic polymer and/or there may be another intermediate layer of an acrylic polymer between the urethane inner layer and the fluoropolymer layer.

For the novel retroreflective sheeting to have good flexibility and stretchability, the layers of the cover film should be intimately bonded to each other. This can be accomplished by laminating preformed films at an elevated temperature, but is more reliably and economically achieved by coextrusion, preferably followed by drawing the extruded composite to reduce it to the desired thickness while the temperature remains sufficiently high to avoid substantial orientation of the material of any layer. By coextruding, it is believed that the acrylic outer layer can be drawn down to a lesser thickness than would be feasible if the acrylic outer layer were formed by itself. Also, coextrusion is fast and economical.

For economy, the composite preferably is extruded directly onto the top surface of retroreflecting base material, with its urethane surface contacting the base material. Instead, the composite may be wound up and later bonded to retroreflecting base material under heat and pressure.

Coextrusion can be carried out using a combining feedblock, but when the melt viscosities differ to a large degree, it is preferred to employ a multi-manifold setup. A multi-manifold die keeps the materials separate until just prior to exitting the die so that their contact time is minimized. This tends to keep the profiles of each as flat as possible while providing good contact and intimate bonding.

Preferably the copolymeric outer layer of the cover film includes an ultraviolet absorber to protect the underlying retroreflecting base material from the degrading effect of ultraviolet radiation. The urethane and any other layer may also include an ultraviolet absorber, especially when the copolymeric outer layer is quite thin. Any of the layers may also include antioxidants or energy quenchers and colorants.

Although any retroreflective sheeting which has a flat, transparent cover film is typically marketed with that cover film at the surface of the retroreflective sheeting, purchasers often apply over the cover film "lettering, symbols, designs, etc., by affixing thereto transparent colored films cut to the required shapes, or by painting with transparent colored paint; thereby forming an overlying transparent colored film or coating . . . which acts as a colored filter . . . " (Palmquist patent, col. 11, lines 30-37).

THE DRAWING

In the drawing, all figures of which are schematic:

Figure 1:
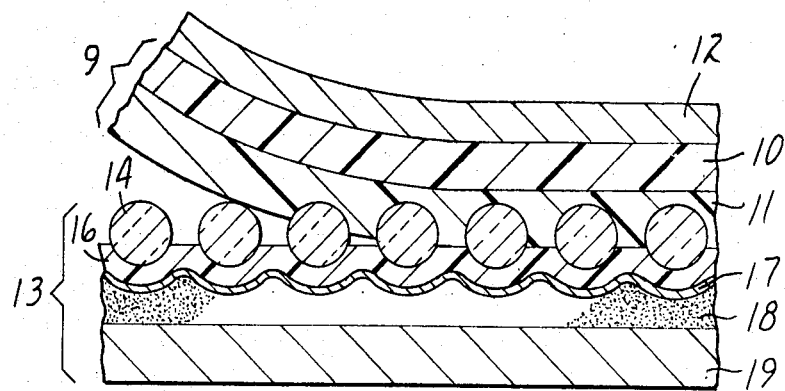
FIG. 1 is a cross section showing the application of a transparent multi-layer cover film to retroreflecting base material to provide enclosed-lens retroreflective sheeting embodying the invention.

Referring to FIG. 1, a transparent, multi-layer cover film 9 has a copolymeric outer layer 10 and a urethane inner layer 11 supported by a dimensionally-stable carrier 12. This composite is shown being applied as flat, transparent cover film to optically incomplete retroreflecting base material 13 which includes substantially a monolayer of glass microspheres 14, a transparent spacing layer 16, a specularly reflective layer 17, an adhesive layer 18, and a protective layer 19. While the multi-layer cover film 9 is being applied, it should be heated so that its urethane layer 11 conforms to the microspheres 14 and becomes intimately bonded to the microspheres and to the surface of the spacing layer 16 between microspheres, thus providing an enclosed-lens retroreflective sheeting of the invention.

Figure 2:
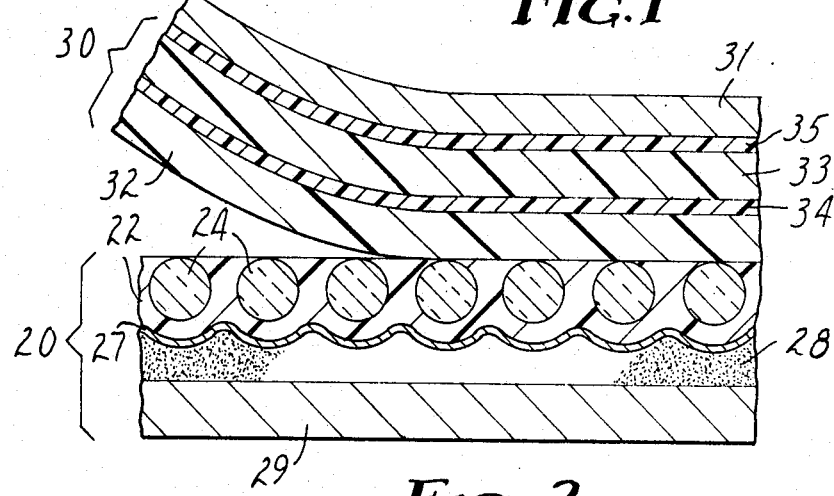
FIG. 2 is a cross section showing the application of a transparent multi-layer cover film to another type of retroreflecting base material to provide another enclosed-lens retroreflective sheeting embodying the invention.

The optically incomplete retroreflecting base material 20 shown in FIG. 2 has a binder layer 22 containing substantially a monolayer of glass microspheres 24, a specularly layer 27, an adhesive layer 28, and a protective liner 29. Shown being applied to the binder layer 22 is a transparent multi-layer cover film 30 which is supported by a dimensionally-stable carrier 31. The cover film 30 includes an outer copolymeric layer 33, an inner urethane layer 32, and intermediate fluoropolymer layer 34, and a substantially methylmethacrylate polymer layer 35 covering the outer copolymeric layer 33. While the multi-layer cover film 30 is being applied, it should be heated so that the urethane layer 32 becomes intimately bonded to the binder layer 22 and also to any of its exposed microspheres 24.

Figure 3:
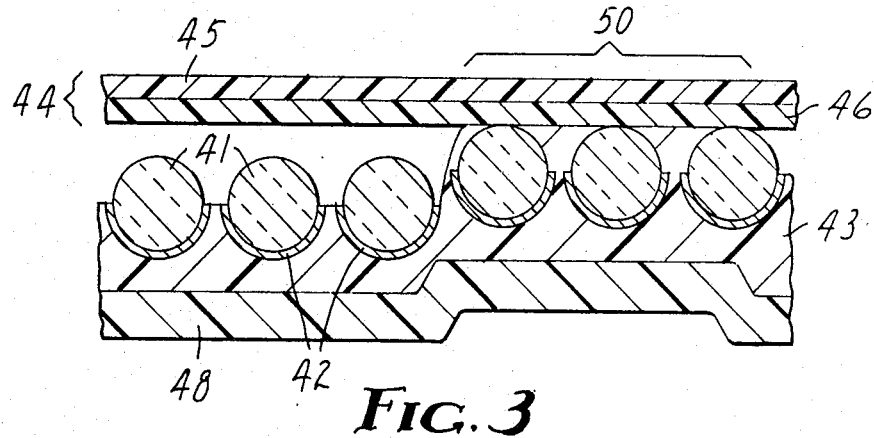
FIG. 3 is a cross section showing encapsulated-lens retroreflective sheeting which has a transparent multi-layer cover film embodying the invention.

The retroreflective sheeting shown in FIG. 3 has substantially a monolayer of glass microspheres 41, specularly reflective layers 42, a transparent or pigmented binder layer 43, a multi-layer cover film 44 consisting of
   an outer copolymeric layer 45 and
   an inner urethane layer 46, and
a disposable low-adhesion carrier web 48 which prevents sticking in the die used to form a grid of hermetically sealed areas 50.

To comment on the schematic nature of FIG. 3, glass microspheres rarely will be of uniform size, and the thicknesses of the layers of the retroreflective sheeting may vary from area to area. The urethane inner layer 46 may be in tangential contact with some of the underlying microspheres or not, depending on a host of incidental factors. Each hermetically sealed area (typically less than 1 cm in breadth) extends across a large number of the microspheres 41.

Transparent Cover Film A

A transparent dual-layer cover film was prepared by coextruding an acrylic copolymer and a urethane polymer onto biaxially-oriented poly(ethylene terephthalate) (PET) film as a carrier web. The acrylic copolymer was a multiphase interpolymer of polymethylmethacrylate (PMMA) and polybutyl acrylate (PBA) and was believed to have a mole % composition of 76% PMMA and 24% PBA ("KORAD" D from Polymer Extruded Products). The urethane polymer was a thermoplastic aliphatic urethane believed to be the reaction product of 1,1'-methylene bis(4-isocyanatocyclohexane), adipic acid, isophthalic acid, and 1,4-butane diol ("Q-thane" P3429 from K. J. Quinn & Co., Inc.). These two materials were extruded through a dual-manifold film die having a 30-cm wide slot for the copolymeric layer and a 20-cm wide slot for the urethane layer. The acrylic copolymer was extruded on a 4.5-cm 30:1 L/D (length/dimeter) extruder using extrusion temperatures of 193° C., 216° C., 199° C., and 204° C. from the hopper end of the extruder to the die end of the extruder, respectively. The urethane was extruded on a 4.5-cm 24:1 L/D extruder using extrusion temperatures of 177° C., 188° C., 193° C., and 193° C. from the hopper end of the extruder to the die end of the extruder respectively. The acrylic section of the die was set at 204° C. while the urethane section of the die was set at 193° C. The acrylic extruder used a two-stage vented screw operated at 25 RPM while the urethane extruder used a single-stage nonvented screw operated at 70 RPM. The film was drawn away at 18.3 m/min. to give a total film thickness of about 60 micrometers which consisted of approximately 12 micrometers of acrylic copolymer and 48 micrometers of urethane polymer.

Transparent Cover Film B

A transparent single-layer cover film was made by extruding the same acrylic copolymer ("KORAD" D) onto PET film carrier through a single-manifold die using the 4.5-cm 30:1 L/D extruder. The extruder temperatures were 221° C., 232° C., 243° C., and 260° C., and the screw was a single-stage barrier flighted screw. The screw was turned at 25 RPM while the film was taken away at 12.2 m/min; providing a film thickness of about 50 micrometers.

Transparent Cover Film C

A transparent dual-layer cover film was prepared in the same manner as Transparent Cover Film A except that the acrylic copolymer was believed to have a mole % composition of 79% PMMA and 21% PBA ("HI-PET HBA" polymer from Mitsubishi Rayon). Extrusion conditions were 177° C., 210° C., 221° C., and 232° C. The total thickness was 37 micrometers of which the acrylic copolymer provided about 12 micrometers.

Testing of Transparent Cover Films

Transparent Cover Films A–C were tested for tensile strength and elongation (ASTM D882-80a), both within a few days after being made and again after being stored in a roll form for six months. Values reported for the dual-layer films were taken at breakage of the acrylic copolymer layer even though the urethane layer continued to stretch. Also reported below are tests for optical transmittance (ASTM D1746-70).

TABLE A

| | Initial | | After 6 months | | |
|---|---|---|---|---|---|
| Film | Tensile (MPa) | Elong. | Tensile (MPa) | Elong. | Transmittance |
| A | 15.6 | 330% | 16.3 | 130% | 87.9% |
| B | 39.6 | 30% | 41.0 | 26% | 86.1% |
| C | — | — | 20.2 | 50% | 88.3% |

EXAMPLE 1

Transparent Cover Film A was laminated to retroreflecting base material which, as shown in FIG. 2 of the drawings, consisted of
  (1) substantially a monolayer of glass microspheres having an average diameter of 60 micrometers, a refractive index of 2.26, and embedded in a binder layer with no exposed microspheres, the binder layer comprising a thermoset polyvinyl butyral and plasticizer;
  (2) a transparent spacing layer of the same material providing a spacing thickness of about 15 micrometers;
  (3) vapor-deposited aluminum layer having a thickness of about 100 nm;
  (4) a pressure-sensitive acrylate adhesive layer; and
  (5) a releasable liner protecting the adhesive layer.
The urethane layer of the Transparent Cover Film A was adhered to the binder layer by passing the cover film around a hot can at 150° C., and after 3.6 seconds in contact with the hot can, the base material was pressed against the cover film using a rubber-covered pressure roller under a force of 19 kg/cm width. The resulting composite remained in contact with the hot can for 8.6 seconds before being chilled, after which the carrier was removed, and the resulting retroreflective sheeting was wound up.

EXAMPLE 2

Retroreflective sheeting was made as in Example 1 except using Transparent Cover Film B instead of A. Also, because the former would not adhere directly to the retroreflecting base material of Example 1, its binder surface was first primed with a very thin solution of a thermoplastic aliphatic urethane resin ("Q-thane" QI 10 solution from K. J. Quinn & Co., Inc.) which dried to a thickness of about 5 micrometers. The laminating conditions were those of Example 1.

EXAMPLE 3

Retroreflective sheeting was prepared as in Example 1 except using Transparent Cover Film C instead of A.

EXAMPLE 4

Retroreflective sheeting was prepared as in Example 1 except using the retroreflecting base material 13 shown in FIG. 1 of the drawing, elements of which were:
Spacing layer 16: polyvinyl butyral
Specularly reflecting layer 17: vapor-deposited aluminum
Glass microspheres 14: 60 micrometers in diameter, 2.26 refractive index.

EXAMPLE 5

Retroreflective sheeting was prepared as in Example 2 except that retroreflecting base material was the same as was used in Example 4.

EXAMPLE 6

Encapsulated-lens retroreflective sheeting was made as shown in FIG. 3 of the drawing using Transparent Cover Film A. The binder layer 43 was a mixture of 82 parts of the thermoplastic aliphatic urethane polymer used in making Transparent Cover Film A and 18 parts of rutile titanium dioxide pigment. The glass microspheres 41 had an average diameter of 65 micrometers and a refractive index of 1.91. The specularly reflective layers 42 were vapor-deposited aluminum about 100 nm in thickness. The low-adhesion carrier web 48 was PET having a thickness of about 25 micrometers.

The cover film was sealed to the binder layer by applying heat and pressure along a network of interconnecting lines using an embossing can having a hexagonal pattern with an open area of about 3 mm and a sealing width of about 0.5 mm. Using a rubber pressure roller, sealing conditions were:

| | |
|---|---|
| Embossing can temp: | 160° C. |
| Pressure: | 19.6 kg/cm width |
| Speed: | 4.1 m/min. |
| Seal width: | 0.3 mm |

After removing the PET carrier web 48, a pressure-sensitive adhesive layer and protective liner were applied in its place.

EXAMPLE 7

Retroreflective sheeting was made as in Example 6 except using Transparent Cover Film B rather than A. (No primer was used). The sealing conditions were:

| | |
|---|---|
| Embossing can temp: | 188° C. |
| Pressure: | 19.6 kg/cm width |
| Speed: | 3.2 m/min. |
| Seal width: | 0.46 mm |

Testing of Retroreflective Sheeting of the Examples

The retroreflective sheeting of the Examples was subjected to tests reported in Table B.

Tensile and Elongation

Testing is per ASTM D882-80a (as in testing the Transparent Cover Films A–C) except that the tensile reported is at yield or, if no yield, at 10% elongation.

Brightness

Measured with a retroluminometer described in United States Defense Publication T987,003 and taken at 0.2° divergence angle and −4° entrance angle. Units are candellas per lumen.

Embossability

The retroreflective sheeting is adhered by its adhesive layer to a soft aluminum blank typical of an automotive license plate and having a thickness of 0.8 mm. The blank is then embossed using a male/female embossing die which produces six figure O's that respectively emboss to depths of 1.3 mm, 1.5 mm, 1.8 mm, 2.0 mm, 2.3 mm, and 2.5 mm. The zeros are 7.7 cm high, 3.1 cm across, and produce a stroke width of 0.7 cm. The slope at the edges of the embossed character varies from 0.35 at 1.3 mm depth to 0.7 at 2.5 mm depth. Table B reports the maximum depth at which no cracks could be seen on visual examination.

Impact Resistance

Tested at 25° C. according to ASTM D2794-82 using a 0.6 mm thickness aluminum panel to which the retroreflective sheeting is attached. The indentation is in the extrusion direction, and the punch has a diameter of 15.9 mm. Failures are reported in Table B. The test is carried to the machine limit of 1.85 kg-m.

Delamination Resistance

A sample of the retroreflective sheeting 2.5 cm in width is adhered by its adhesive layer to an aluminum blank. A sharp razor blade is then used to carefully slice the cover film away from its retroreflecting base material. The loose cover film is then carefully peeled back further by hand until it is uniformly peeling back from the base material. Then the freed cover film is inserted into the jaws of a tensile testing machine, and the force to delaminate the cover film from the underlying layer at a 90° angle of delamination is reported in kg/cm width.

TABLE B

| Example | Tensile (MPa) | Elong. at break | Brightness (candellas per lumen) | Embossability | Impact Resistance (kg-m) | Delamin. Resistance (kg/cm wd) |
|---|---|---|---|---|---|---|
| 1 | 6.8 | 265% | 76 | 2.6 mm | NF | .54 |
| 2 | 17.9 | 95% | 72 | 1.3 mm | .692 | Inseparable |
| 3 | 9.4 | 130% | 72 | 2.0 mm | NF | .54 |
| 4 | 15.3 | 10% | 167 | 2.6 mm* | .462 | Inseparable |
| 5 | 17.5 | 5% | 178 | 1.5 mm* | .231 | Inseparable |
| 6 | 9.1 | 100% | 295 | 2.6 mm | NF | 1.6 |
| 7 | 12.1 | 25% | 250 | 1.3 mm | .231 | .57 |

*Reported value refers to the cover film. The retroreflecting base material cracked at 1.3 mm.
NF = No failure

I claim:
1. Retroreflective sheeting having a flat, transparent, multi-layer cover film, an outer layer comprising an acrylic copolymer of monomers comprising methyl methacrylate and another acrylate or methacrylate, the alkyl or aralkyl group of which contains up to eight carbon atoms, the methyl methacrylate comprising from 20 to 90 percent by weight of the monomers, and an inner layer comprising a thermoplastic aliphatic urethane polymer.

2. Retroreflective sheeting as defined in claim 1 wherein said monomers comprise at least one of ethyl acrylate, n-butyl acrylate, and n-butyl methacrylate.

3. Retroreflective sheeting as defined in claim 2 wherein the acrylic outer layer is a copolymer of 60 to 80 parts of methyl methacrylate and correspondingly 40 to 20 parts by weight of at least one of ethyl acrylate, n-butyl acrylate, and n-butyl methacrylate.

4. Retroreflective sheeting as defined in claim 1 wherein the thickness of the inner urethane layer exceeds that of the outer acrylic layer.

5. Retroreflective sheeting as defined in claim 1 wherein the thickness of the acrylic outer layer is from 5 to 40 micrometers.

6. Retroreflective sheeting as defined in claim 1 wherein the thickness of the inner urethane layer is not more than about 200 mm.

7. Retroreflective sheeting as defined in claim 1 wherein the inner and outer layers are coextruded.

8. Retroreflective sheeting as defined in claim 1 wherein the elongation of the cover film is at least 50%.

9. Retroreflective sheeting as defined in claim 1 of the enclosed-lens type including a binder layer to which the inner urethane layer is sealed over its full area.

10. Retroreflective sheeting as defined in claim 1 of the encapsulated-lens type including a binder layer to which the inner urethane layer is sealed along a network of interconnecting lines to form a plurality of hermetically sealed cells within which the microspheres are encapsulated and have an air interface.

11. Method of making a transparent cover film for retroreflective sheeting comprising coextruding at least two layers, one layer comprising an acrylic copolymer of monomers including methyl methacrylate and another acrylate or methacrylate, the alkyl or aralkyl group of which contains up to eight carbon atoms, and another layer comprising a thermoplastic aliphatic urethane polymer.

12. Method as defined in claim 11 including a subsequent step of drawing the extruded composite to substantially reduce its thickness to less than 240 micrometers while substantially avoiding orientation of the material of either layer.

13. Method as defined in claim 12 wherein in said additional step the thickness of the outer acrylic layer is reduced to within the range of from 5 to 40 micrometers.

14. Method as defined in claim 11 including a subsequent step of bonding the urethane layer of the drawn composite to the top surface of retroreflecting base material.

15. Method of making a transparent cover film for retroreflective sheeting comprising laminating at an elevated temperature preformed films, one film comprising an acrylic copolymer of monomers including methyl methacrylate and another acrylate or methacrylate, the alkyl or aralkyl group of which contains up to eight carbon atoms, and another film comprising a thermoplastic aliphatic urethane polymer.

* * * * *